United States Patent
Zhang et al.

(10) Patent No.: US 11,210,008 B2
(45) Date of Patent: Dec. 28, 2021

(54) MEMORY SYSTEM FOR MULTI-CLUSTERING READ THRESHOLDS AND METHOD THEREOF

(71) Applicant: SK hynix Inc., Gyeonggi-do (KR)

(72) Inventors: Fan Zhang, Fremont, CA (US);
Chenrong Xiong, San Jose, CA (US);
Xuanxuan Lu, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 38 days.

(21) Appl. No.: 16/747,366

(22) Filed: Jan. 20, 2020

(65) Prior Publication Data
US 2021/0223974 A1 Jul. 22, 2021

(51) Int. Cl.
*G06F 3/06* (2006.01)
(52) U.S. Cl.
CPC .......... *G06F 3/0644* (2013.01); *G06F 3/0619* (2013.01); *G06F 3/0659* (2013.01); *G06F 3/0679* (2013.01)
(58) Field of Classification Search
CPC .................................................... G06F 3/0619
See application file for complete search history.

(56) References Cited

U.S. PATENT DOCUMENTS

| | | | |
|---|---|---|---|
| 10,102,920 B2 | 10/2018 | Reusswig et al. | |
| 2016/0371034 A1* | 12/2016 | Kang | G06F 12/0615 |
| 2017/0235633 A1* | 8/2017 | Park | G06F 11/1048 |
| | | | 714/764 |
| 2019/0108091 A1* | 4/2019 | Chen | G06F 11/1471 |

* cited by examiner

*Primary Examiner* — Daniel D Tsui
*Assistant Examiner* — Nicholas A. Paperno
(74) *Attorney, Agent, or Firm* — IP & T Group LLP

(57) ABSTRACT

A memory system includes a memory device and a controller. The controller performs multiple read operations on a target block, using a first cluster of read threshold voltages. The controller generates a second cluster of read threshold voltages using the first cluster when a difference between the maximum number of fail bits and the minimum number of fail bits associated with the multiple read operations exceeds a threshold. The controller splits pages in the target block into a first group of pages for the first cluster and a second group of pages for the second cluster. The controller performs additional read operations on the first group of pages using the first cluster and on the second group of pages using the second cluster.

17 Claims, 11 Drawing Sheets

MEMORY SYSTEM FOR MULTI-CLUSTERING READ THRESHOLDS AND METHOD THEREOF

BACKGROUND

1. Field

Embodiments of the present disclosure relate to a scheme for performing read operations for a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory systems may use various read thresholds to perform read operations.

SUMMARY

Aspects of the present invention include a memory system and a method for performing read retry operations using multi-clusters of read threshold values.

In one aspect, a memory system includes a memory device including a plurality of blocks and a controller. The controller performs multiple read operations on a target block among the plurality of blocks, using a first cluster of multiple read threshold voltages. The controller generates a second cluster of multiple read threshold voltages using the first cluster when a difference between the maximum number of fail bits and the minimum number of fail bits associated with the multiple read operations exceeds a threshold. The controller splits a plurality of pages in the target block into a first group of pages for the first cluster and a second group of pages for the second cluster. The controller performs additional read operations on the first group of pages using the first cluster and on the second group of pages using the second cluster.

In another aspect, a method for operating a memory system includes performing multiple read operations on a target block among a plurality of blocks, using a first cluster including multiple read threshold voltages; generating a second cluster using the first cluster when a difference between the maximum number of fail bits and the minimum number of fail bits associated with the multiple read operations exceeds a threshold; splitting a plurality of pages in the target block into a first group of pages for the first duster and a second group of pages for the second duster; and performing additional read operations on the first group of pages using the first cluster and on the second group of pages using the second cluster.

Additional aspects of the present invention will become apparent from the following description.

DETAILED DESCRIPTION

Figure 1:
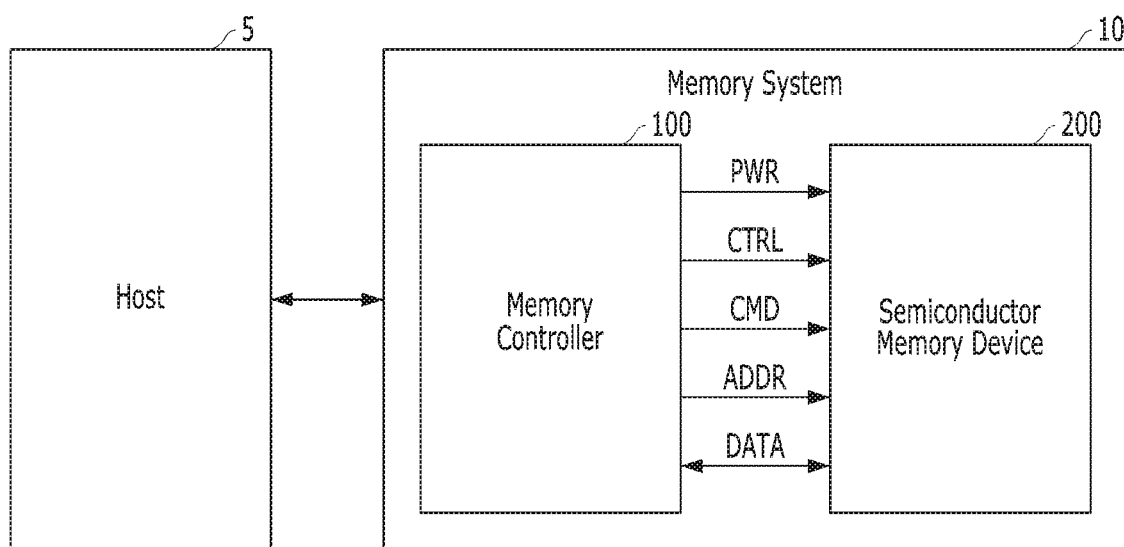
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines.

The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
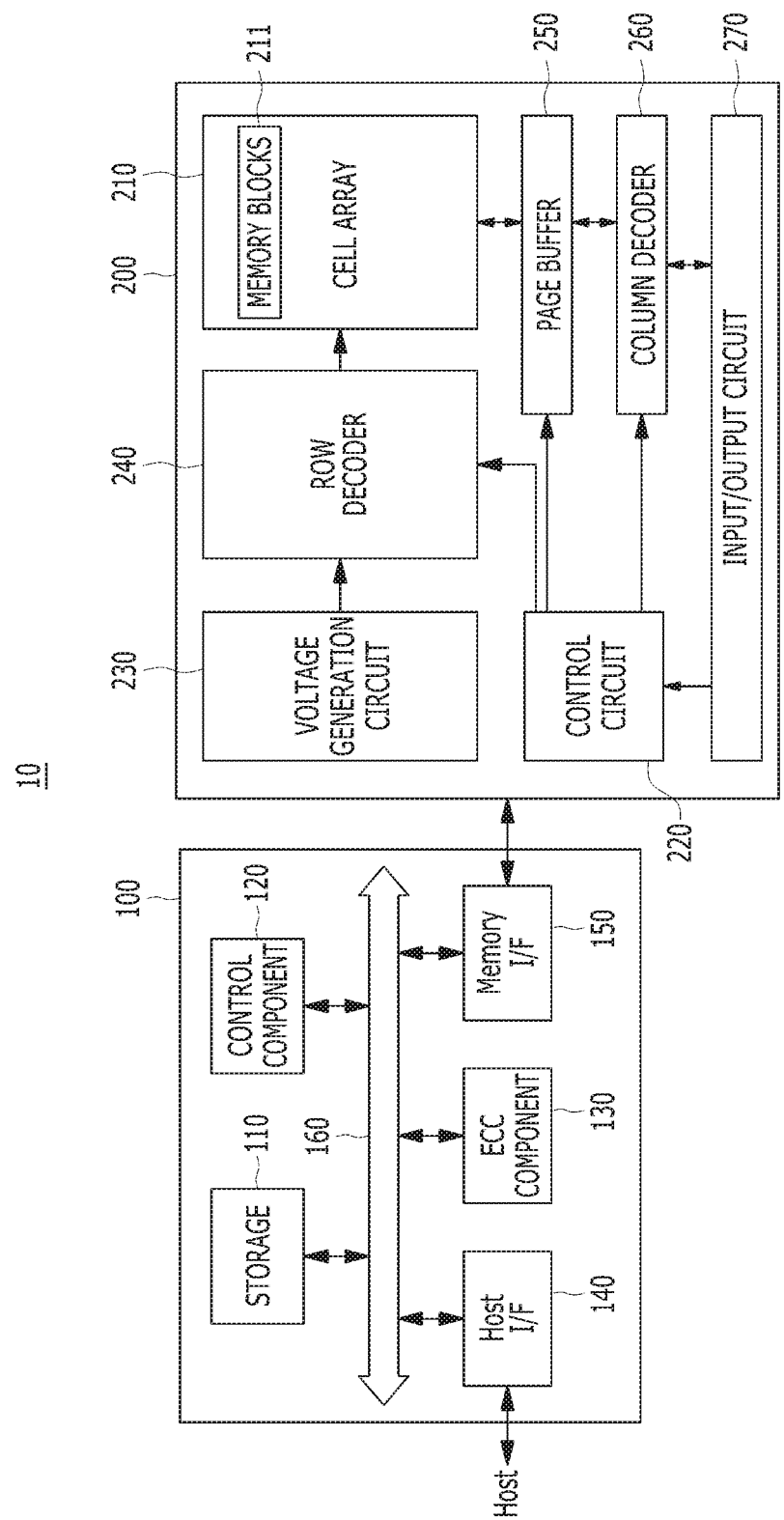
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
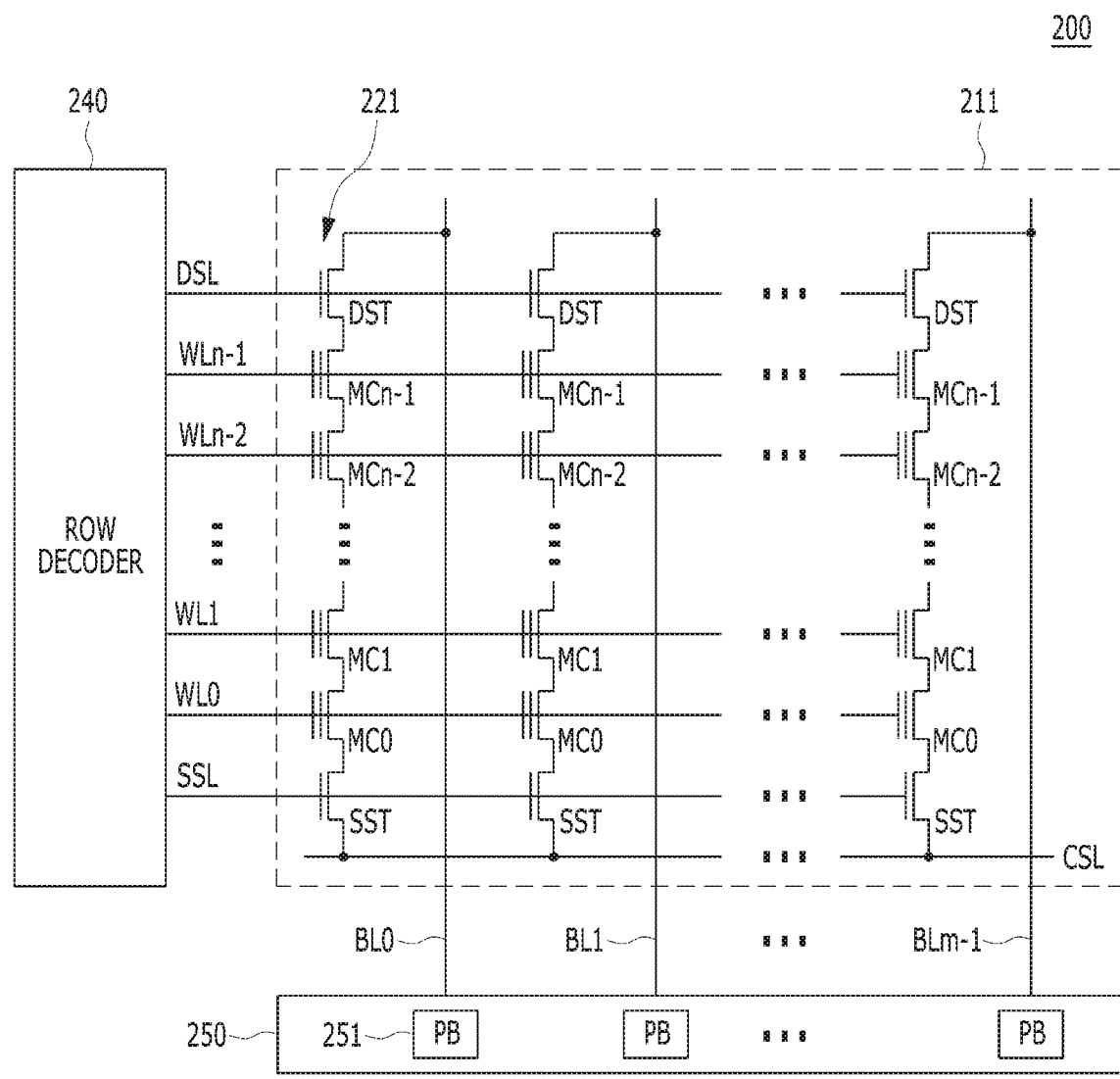
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

A memory device such as a flash memory (e.g., NAND flash memory) may include a plurality of memory blocks (e.g., hundreds to thousands of memory blocks). Each block typically includes a plurality of wordlines (e.g., hundreds of wordlines). Each cell coupled to each word line may include multiple logical pages. The memory device may include a plurality of memory cells and store multiple bits per cell by modulating the cell into different states or program voltage (PV) levels through a programming operation.

Figure 4A:
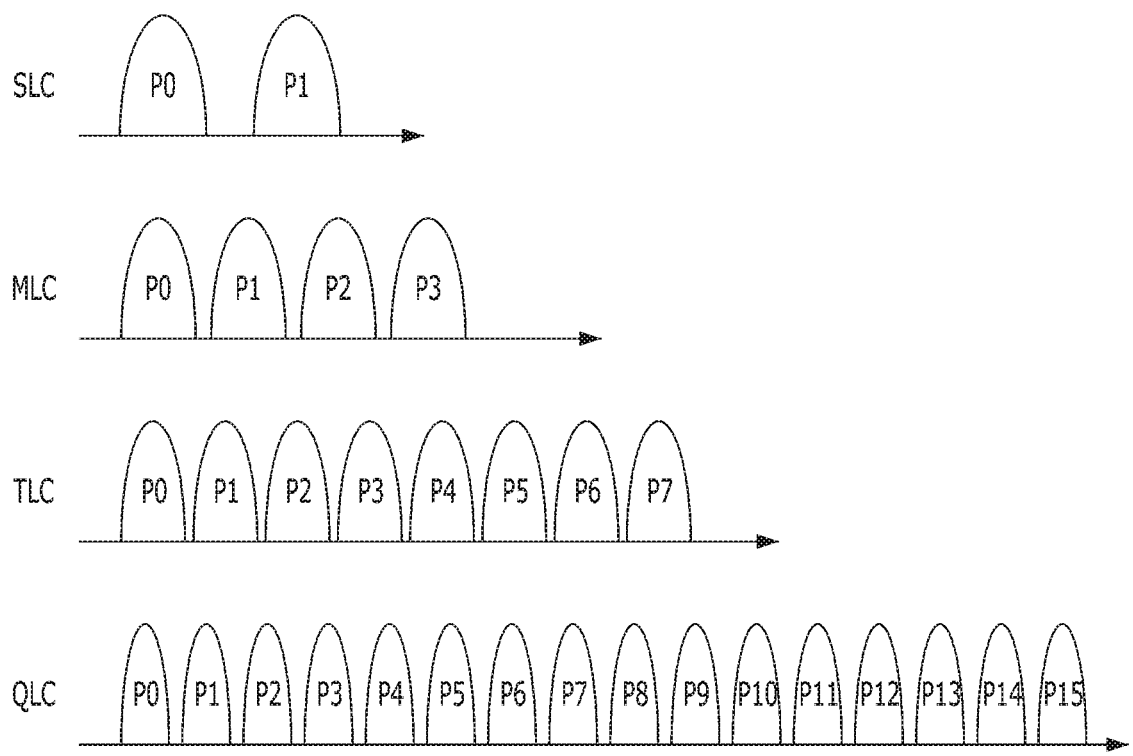
FIG. 4A is a diagram illustrating distributions of states for different types of cells of a memory device.

FIG. 4A is a diagram illustrating distributions of states or program voltage (PV) levels for different types of cells of a memory device.

Referring to FIG. 4A, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

As such, for an n-bit multiple level cell flash memory, cells can be modulated into multiple states based on their program voltage levels. SLC, MLC, TLC and QLC memories can store one bit, two bits, three bits and four bits respectively in each cell using 2, 4, 8 and 16 possible states.

Figure 4B:
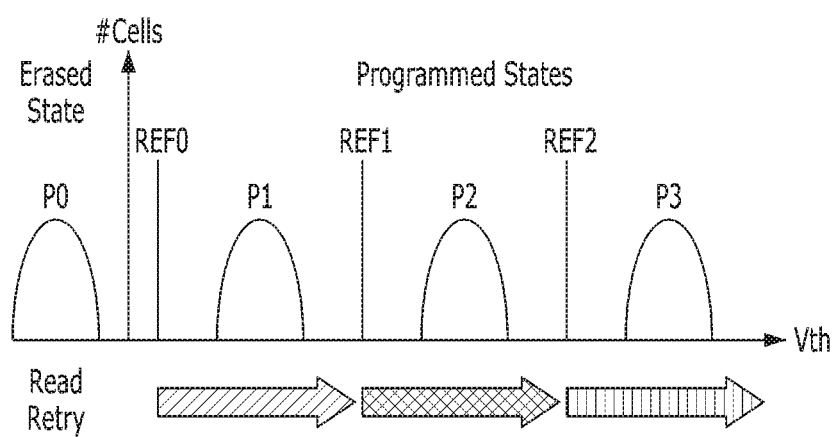
FIG. 4B is a diagram illustrating read retry operations due to shifted read threshold voltages in a memory device.

To determine bit(s) stored in a cell, the cell may be read with read thresholds or read threshold voltages (e.g., reference voltages REF0, REF1, REF2) which lie between an erased state and a program state (REF0) and between adjacent program states (REF1 and REF2), as shown in FIG. 4B. Initially, read thresholds may be fixed. However, due to program and erase (P/E) cycling, charge loss over time and/or program interference from the programming of neighbor cells, optimal read thresholds may shift over time. To resolve errors caused by shifted read thresholds, a read retry operation may be performed using adjusted read thresholds. For the read retry operation for each block, a read level table (RLT) may be used.

Figure 4C:
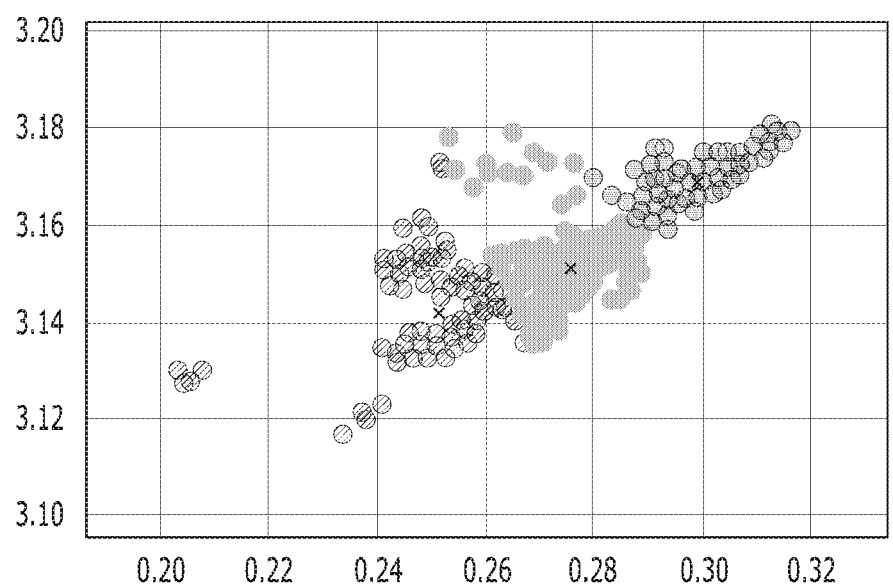
FIG. 4C is a diagram illustrating distributions of optimal read threshold voltages on pages in a memory block.

However, there may be certain conditions that arise making one read level table for each block not enough. For example, as shown in FIG. 4C, frequent hopping between different read threshold settings are observed and optimal read thresholds for pages (e.g., low significant bit (LSB) pages) in a block may have large variation across different physical locations. In FIG. 4C, the x-axis and y-axis are the optimal Vt of the read thresholds. The graph shows that there are large variations across pages in a block in terms of optimal read thresholds. Accordingly, various embodiments provide a multi-clustering scheme to update a read level table for each block in a memory device such as a NAND flash memory. In accordance with the multi-clustering scheme, multiple clusters (i.e., read retry tables (RRTs)) may be generated based on decoding error characteristics (i.e., fail bits) of pages. Each cluster may include entries (or indices) on read retry thresholds.

Figure 5:
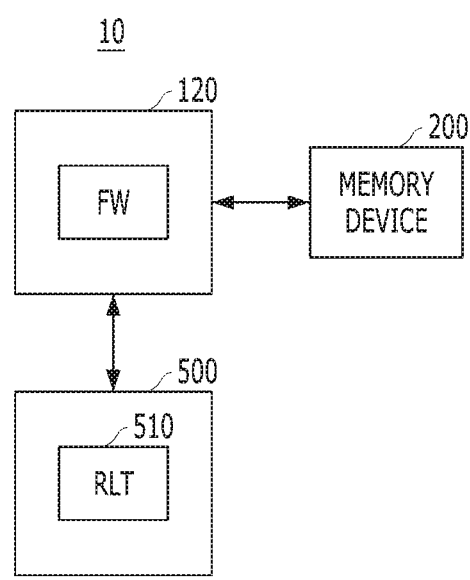
FIG. 5 is a diagram illustrating a memory system in accordance with an embodiment of the present invention.

FIG. 5 is a diagram illustrating a memory system 10 in accordance with an embodiment of the present invention.

Referring to FIG. 5, the memory system 10 may include a control component 120, a memory device 200 and a memory 500. For example, the control component 120, the memory device 200 and the memory 500 of FIG. 5 may be implemented as components of the memory system 10 shown in FIG. 2, with the control component 120 and the memory 500 being part of the controller 100 of the memory system 10. Alternatively, the memory 500 may be disposed externally to the controller 100 and coupled therewith.

The control component 120 may include firmware (FW). The firmware may maintain a read level table (RLT) 510 for each block of the memory device 200 and store the read level table 510 in the memory 500. The read level table 510 may represent multiple read level tables, one for each of the plurality of memory blocks in the memory device 200. Thus, when the memory device 200 includes N memory blocks, the memory 500 may include N read level tables respectively corresponding to the N memory blocks. The read level table 510 may store the number of read retries. Further, the read level table 510 may store information on a plurality of read thresholds for read operations as read levels to detect states of cells. The plurality of read thresholds may include one or more default read thresholds and one or more read retry thresholds. The read retry thresholds may include multiple thresholds, some above and some below a particular default read threshold. Alternatively, the read retry thresholds may be in the form of differentials, i.e., increments and decrements from a particular default read threshold.

The firmware may receive a read command from a host (e.g., the host 5 of FIG. 1). The firmware may load information on a read threshold from the read level table 510 in response to the read command. The firmware may provide the information on the read threshold to the memory device 200. The memory device 200 may generate a read voltage corresponding to the read threshold using a voltage generator therein. Further, the memory device 200 may perform a read operation on a target page in a selected memory block among the plurality of memory block, by applying the read voltage to the target page.

When a read operation fails, the firmware may perform read retry operation(s) using one or more read retry thresholds in the read level table 510. Initially, the read level table 510 may store information on a cluster of read retry thresholds in a read retry table (RRT) for a block. The read retry table (RRT) may be set to have default values, for example, RRT0=[R0, R1, R2, R3, R4, R5]. For example, R0 may be read threshold REF1 of FIG. 4B and R1 to R5 may be thresholds, each of which is incremented or decremented by a set value from REF1.

When the number of read retries exceeds a maximum allowable number, the firmware may update the read level table 510. To update the read level table 510, the firmware may select another cluster of read retry thresholds to generate another read retry table for the block. The new cluster may be selected according to the distance of all the read retry thresholds (i.e., the distance from the previous read retry threshold). For the given 50 RRT's, certain distance metric may be defined. Next read threshold may be selected based on the distance of the rest RRT entries and the control component 120 can pick the closest one first.

Figure 6:
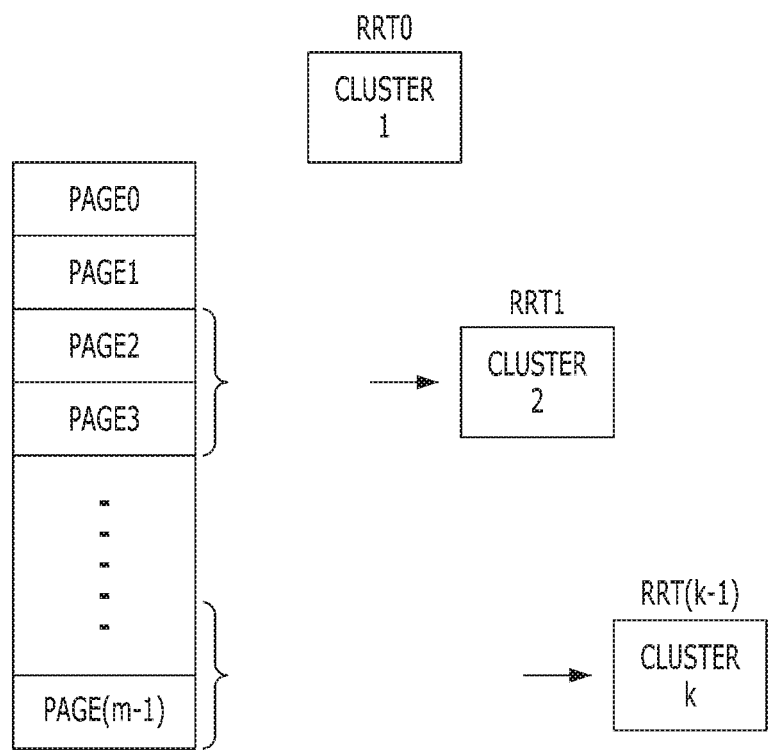
FIG. 6 is a diagram illustrating an operation of generating clusters to a plurality of pages in accordance with an embodiment of the present invention.

FIG. 6 is a diagram illustrating an operation of generating clusters to a plurality of pages in accordance with an embodiment of the present invention. The operation of FIG. 6 may be performed by the control component 120 in FIG. 5.

Referring to FIG. 6, a block may include a plurality of pages, e.g., PAGE0 to PAGE(m-1). Initially, as a read retry table, a cluster of read retry thresholds may be generated for the block and used for read operations on target pages of the block. For example, a read retry table RRT0 representing a cluster CLUSTER1 may be set to default read retry values, i.e., RRT0=[R0, R1, R2, R3, R4, R5].

Two or more additional clusters of read retry thresholds (CLUSTER2 to CLUSTERk) may be generated based on decoding error characteristics (i.e., the number of fail bits) of select pages of all pages PAGE0 to PAGE(m-1). By way of example and not limitation, a read retry table RRT1 representing a cluster CLUSTER2 may be generated from results of read operations performed on pages PAGE2 to PAGE3, i.e., RRT1=[R10, R11, R12, R13, R14, R15]. A read retry table RRT(k-1) representing a cluster CLUSTERk may be generated from read operation results of one or more other pages, i.e., RRT(k-1)=[Rk0, Rk1, Rk2, Rk3, Rk4, Rk5].

Figure 7:
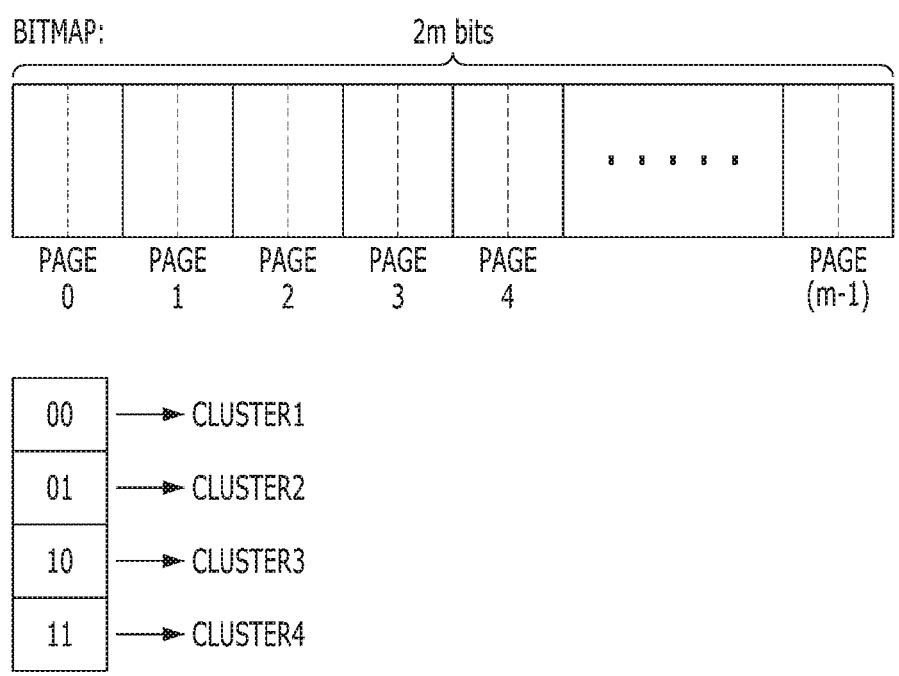
FIG. 7 is a diagram illustrating bitmap information in accordance with an embodiment of the present invention.

FIG. 7 is a diagram illustrating bitmap information in accordance with an embodiment of the present invention. The bitmap information of FIG. 7 may be generated and used by the control component 120 in FIG. 5.

Referring to FIG. 7, the bitmap information may be a string of bits in which one or more bits is used to indicate to which cluster each of a plurality of pages (e.g., m pages of FIG. 6) belongs. By way of example and not limitation, 4 clusters are generated for m pages. The bitmap information may include 2 m bits, with each cluster being identified by 2 bits. For example, in PAGE0, a value "00" may indicate that PAGE0 corresponds to CLUSTER1, a value "01" may indicate that PAGE0 corresponds to CLUSTER2, a value "10" may indicate that PAGE0 corresponds to CLUSTER3, and a value "11" may indicate that PAGE0 corresponds to CLUSTER4. In another embodiment, a different number of clusters, e.g., 2, may be generated for m pages. In a two cluster arrangement, the bitmap information may include m bits, with 1 bit being used to associate a particular page with a cluster.

Figure 8:
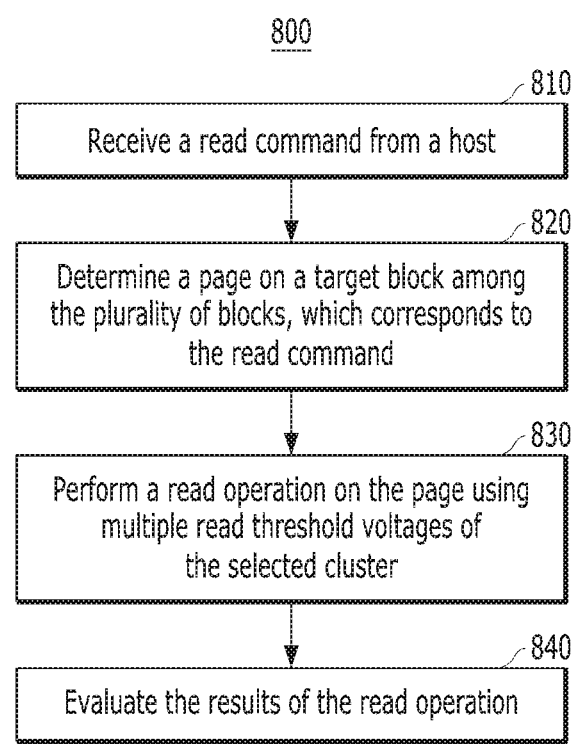
FIG. 8 is a flowchart illustrating a method for operating a memory system in accordance with an embodiment of the present invention.

FIG. 8 is a flowchart illustrating an operation 800 of a memory system in accordance with an embodiment of the present invention. The operation 800 may be performed by the control component 120 in FIG. 5 after a first cluster is generated, and certain steps may be performed additional times using newly generated clusters, as shown in FIG. 6, based on the results of the read operations performed using the read retry voltages of the previous cluster.

Referring to FIG. 8, the operation 800 may include steps 810 to 840. At step 810, the control component 120 may receive a read command from a host.

At step 820, the control component 120 may determine a page on a target block, among the plurality of blocks, which corresponds to the read command.

At step 830, the control component 120 may perform read operations on the page using multiple read threshold voltages of the first cluster.

At step 840, the results of the read operation performed at step 830 are evaluated. A second cluster may be generated using the first cluster when a difference between the maximum number of fail bits and the minimum number of fail bits associated with read operations on the target block using the first cluster exceeds a threshold. In this case, step 830 is repeated using the multiple read threshold voltages of the second cluster.

Figure 9:
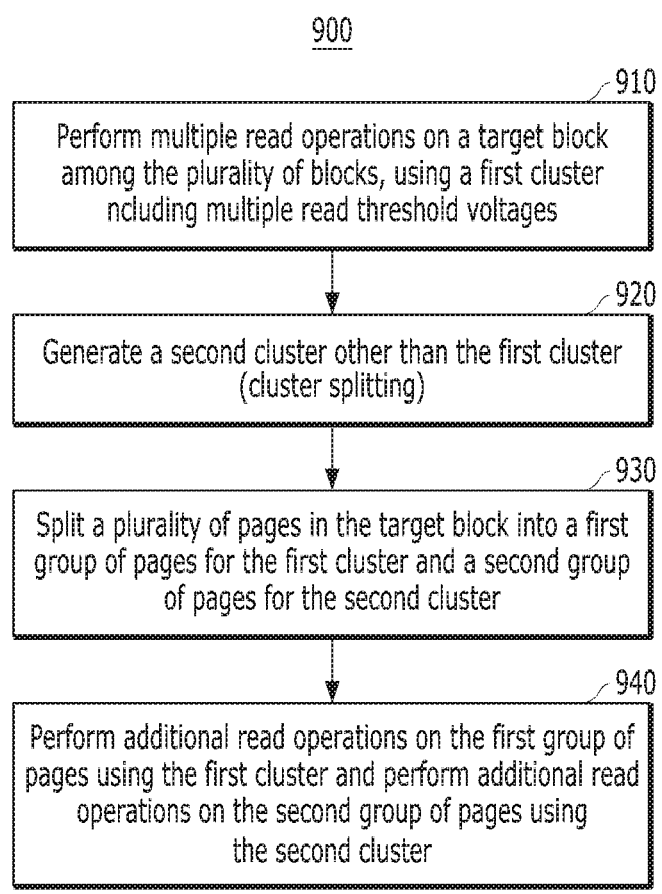
FIG. 9 is a flowchart illustrating a method for operating a memory system in accordance with an embodiment of the present invention.

FIG. 9 is a flowchart illustrating an operation 900 of a memory system in accordance with an embodiment of the present invention. The operation 900 may be performed by the control component 120 in FIG. 5.

Before performing the operation 900, initialization may be performed. At power up, for every block, the number of clusters C may be set to 1, and entries of a read retry table (RRT) of the first cluster may be set to default values, for example, RRT0=[R0, R1, R2, R3, R4, R5]. Every block may be associated with variables as shown in List1.

List1:
Minimum FB count FC1=0 and Maximum FB count FC2=0; and
Bitmap M is set to have all 0s.

In List1, variables may include FC1, FC2 and M. FC1 represents the minimum number of fail bits (FB), i.e., the minimum FB count. FC2 represents the maximum number of FB, i.e., the maximum FB count. M represents Bitmap. FC1 and FC2 may be set to have a value "0", and M may be set to have all values of "0". Bitmap M may have a size of 2 m bits, where m is the number of pages in a block.

Referring to FIG. 9, the operation 900 may steps 910 to 940. At step 910, the control component 120 may perform multiple read operations on a target block among the plurality of blocks, using the first cluster including multiple read threshold voltages, for example, RRT0=[R0, R1, R2, R3, R4, R5].

In each read operation, the first cluster may be updated based on success or failure in the current read operation.

Success or failure of the current read operation may be determined based on a decoding result performed by the ECC component 130 of FIG. 2. In some embodiments, when read operations using current read threshold voltages do not succeed, the first cluster may be updated by rearranging the order of the read retry thresholds in the first cluster based on how successful they were, with the most successful read retry threshold being the highest in the order. For example, when decoding associated with the read operations carried out using R0 and R1 failed and decoding succeeded using R2, the first cluster may be rearranged to have an order of [R2, R0, R1, R3, R4, R5]. In this case, the rearranging is done directly after a successful read retry voltage is found; thus read retry voltages R3, R4 and R5 were not needed. Alternatively, other rules may be used to update the cluster such as L2 distance based approach. The L2 distance represents the distance between RRT entries. For example, if R4 fails to decode, the control component 120 may go to the distance map and look for the RRT entry which is closest R4 for next trial.

After successful decoding, the control component 120 may store FB count (FC). When FC is greater than the maximum FB count (FC2), FC2 may be set as FC. When FC is less than the minimum FB count (FC1), FC1 may be set as FC. In other words, if (FC>FC2) FC2=FC; if (FC<FC1) FC1=FC.

After performing multiple read operations, at step 920, the control component 120 may generate a second cluster different than the first cluster. In an embodiment, the control component 120 may split the first cluster into two clusters. In splitting the first cluster, the read retry voltages in the first cluster are grouped among the two new clusters. In some embodiments, the second cluster may be generated using the first cluster when a difference between the maximum number of fail bits (FC2) and the minimum number of fail bits (FC1) associated with the multiple read operations exceeds a threshold.

In some embodiments, the control component 120 may generate a new cluster (i.e., the second cluster) when there is any cluster for which the difference between FC2 and FC1 exceeds a threshold (delta2) and the number of clusters is less than a set value (e.g., 4). In other words, if (FC2−FC1)>delta2 && C<4, a new cluster is generated. After generating the new cluster as cluster c=C, the control component 120 may initialize the new cluster as the previous cluster. In other words, RRTc=RRT(c−1). Further, the control component 120 may set FC2=0 and FC1=0 for clusters c and (c−1).

At step 930, the control component 120 may split a plurality of pages in the target block into a first group of pages for the first cluster and a second group of pages for the second cluster. In some embodiment, the control component 120 may evenly split the pages with cluster index c to pages with cluster index c and pages with cluster index (c+1) in the bitmap.

At step 940, the control component 120 may perform additional read operations on the first group of pages using the first cluster and perform additional read operations on the second group of pages using the second cluster.

The control component 120 may also perform cluster merging after cluster splitting under certain conditions. In this operation, the control component 120 may merge two clusters (e.g., first cluster and the second cluster) when a difference between the maximum number of fail bits FC2($i/j$) and the minimum number of fail bits FC1($i/j$) associated with the additional read operations is less than a threshold value (delta1). In some embodiments, the control component 120 may check to see if there are two clusters i and j such that (FC2($i$)−FC1($i$))<delta1 and (FC2($j$)−FC1($j$))<delta1 and (FC2($i$)−FC1($j$))<delta1 and (FC2($j$)−FC1($i$))<delta1. If so, the control component 120 may merge cluster i and j by setting FC1, FC2, RRT and M to be from either cluster. Through the cluster merging, the number of clusters C may be decreased by 1. After a merged cluster is generated, additional read operations are performed using the read retry voltages of the merged cluster.

As described above, the controller in accordance with embodiments may update a read level table for each block based on a multi-clustering scheme. In the multi-clustering scheme, multiple clusters (i.e., read retry tables (RRTs)) are generated based on decoding error characteristics (i.e., fail bits) of pages. Accordingly, appropriate read retry table are used for read retry operation on each page, thus reducing the latency of read operation.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A memory system comprising:
a memory device including a plurality of blocks; and
a controller, coupled to the memory device, suitable for:
performing multiple read operations on a target block among the plurality of blocks, using a first cluster of multiple read threshold voltages;
generating a second cluster of multiple read threshold voltages using the first cluster when a difference between the maximum number of fail bits and the minimum number of fail bits associated with the multiple read operations exceeds a threshold;
splitting a plurality of pages in the target block into a first group of pages for the first cluster and a second group of pages for the second cluster; and
performing additional read operations on the first group of pages using the first cluster and on the second group of pages using the second cluster,
wherein the controller further merges the first cluster and the second cluster when a difference between the maximum number of fail bits and the minimum number of fail bits associated with the additional read operations is less than a threshold value.

2. The memory system of claim 1, wherein the controller updates each cluster based on success or failure of each of the multiple read threshold voltages in corresponding read operations.

3. The memory system of claim 2, wherein the controller updates each cluster that is actively in the process of being updated by rearranging an order of the multiple read threshold voltages in that cluster based on success or failure in the read operations using that cluster.

4. The memory system of claim 3, wherein the controller rearranges the order of the multiple read threshold voltages in each cluster that is actively in the process of being updated such that a successful read threshold voltage has a highest order.

5. The memory system of claim 1, wherein the controller evenly splits the plurality of pages into the first group of pages and the second group of pages.

6. The memory system of claim 1, wherein the controller further generates information indicating whether each of the plurality of pages belongs to the first cluster or the second cluster.

7. The memory system of claim 6, wherein the information includes a bitmap including multiple bits, at least one bit indicating the first cluster or the second cluster.

8. The memory system of claim 1, wherein the additional read operations include first read operations on the first group of pages and second read operations on the second group of pages, and
wherein the controller merges the first cluster and the second cluster, when a difference between the maximum number of fail bits and the minimum number of fail bits associated with the first read operations on the first group of pages is less than a threshold value,
when a difference between the maximum number of fail bits and the minimum number of fail bits associated with the second read operations on the second group of pages is less than the threshold value,
when a difference between the maximum number of fail bits associated with the first read operations and the minimum number of fail bits associated with the second read operations is less than the threshold value, and
when a difference between the maximum number of fail bits associated with the second read operations and the minimum number of fail bits associated with the first read operations is less than the threshold value.

9. A memory system comprising:
a memory device including a plurality of blocks; and
a controller coupled to the memory device, suitable for:
receiving a read command from a host;
determining a page on a target block among the plurality of blocks, the page corresponding to the read command; and
performing a read operation on the page using multiple read threshold voltages of selected first cluster,
wherein a second cluster is generated using the first cluster when a difference between the maximum number of fail bits and the minimum number of fail bits associated with read operations on the target block using the first cluster exceeds a threshold,
wherein the controller further merges the first cluster and the second cluster when a difference between the maximum number of fail bits and the minimum number of fail bits associated with the additional read operations is less than a threshold value.

10. A method for operating a memory system comprising:
performing multiple read operations on a target block among a plurality of blocks, using a first cluster including multiple read threshold voltages;
generating a second cluster using the first cluster when a difference between the maximum number of fail bits and the minimum number of fail bits associated with the multiple read operations exceeds a threshold;
splitting a plurality of pages in the target block into a first group of pages for the first cluster and a second group of pages for the second cluster;
performing additional read operations on the first group of pages using the first cluster and on the second group of pages using the second cluster; and
merging the first cluster and the second cluster when a difference between the maximum number of fail bits and the minimum number of fail bits associated with the additional read operations is less than a threshold value.

11. The method of claim 10, wherein the performing of the multiple and additional read operations includes updating each cluster that is actively in the process of being updated based on success or failure of the multiple read threshold voltages in corresponding read operations.

12. The method of claim 11, wherein the updating includes rearranging an order of the multiple read threshold voltages of each cluster that is actively in the process of being updated based on the success or the failure in the read operations using that cluster.

13. The method of claim 12, wherein the rearranging of the order of the multiple read threshold voltages of each cluster that is actively in the process of being updated includes rearranging the order of the multiple read threshold voltages of each cluster that is actively in the process of being updated such that a successful read threshold voltage has a highest order.

14. The method of claim 10, wherein the splitting of the plurality of pages includes evenly splitting the plurality of pages into the first group of pages and the second group of pages.

15. The method of claim 10, further comprising: generating information indicating whether each of the plurality of pages belongs to the first cluster or the second cluster.

16. The method of claim 15, wherein the information includes a bitmap including multiple bits, at least one bit indicating the first cluster or the second cluster.

17. The method of claim 10, wherein the additional read operations include first read operations on the first group of pages and second read operations on the second group of pages, and
wherein the merging of the first cluster and the second cluster includes:
merging the first cluster and the second cluster, when a difference between the maximum number of fail bits and the minimum number of fail bits associated with the first read operations on the first group of pages is less than a threshold value,
when a difference between the maximum number of fail bits and the minimum number of fail bits associated with the second read operations on the second group of pages is less than the threshold value,
when a difference between the maximum number of fail bits associated with the first read operations and the minimum number of fail bits associated with the second read operations is less than the threshold value, and
when a difference between the maximum number of fail bits associated with the second read operations and the minimum number of fail bits associated with the first read operations is less than the threshold value.

* * * * *